US011514108B2

(12) United States Patent
Lehtiniemi et al.

(10) Patent No.: US 11,514,108 B2
(45) Date of Patent: Nov. 29, 2022

(54) CONTENT SEARCH

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 907 days.

(21) Appl. No.: 16/091,737

(22) PCT Filed: Apr. 12, 2017

(86) PCT No.: PCT/FI2017/050265
§ 371 (c)(1),
(2) Date: Oct. 5, 2018

(87) PCT Pub. No.: WO2017/182699
PCT Pub. Date: Oct. 26, 2017

(65) Prior Publication Data
US 2019/0095451 A1 Mar. 28, 2019

(30) Foreign Application Priority Data
Apr. 18, 2016 (EP) .................................... 16165856

(51) Int. Cl.
G06F 16/738 (2019.01)
G06F 3/01 (2006.01)
(Continued)

(52) U.S. Cl.
CPC ............ *G06F 16/738* (2019.01); *G06F 3/013* (2013.01); *G06F 3/0482* (2013.01);
(Continued)

(58) Field of Classification Search
None
See application file for complete search history.

(56) References Cited

U.S. PATENT DOCUMENTS 10,402,856 B2* 9/2019 Dhawan .............. G06Q 30/0255
10,949,882 B2* 3/2021 Du ..................... G06Q 30/0241
(Continued)

FOREIGN PATENT DOCUMENTS

EP        3112986 A    1/2017
WO    1997/015889 A1   5/1997
(Continued)

OTHER PUBLICATIONS

Ramirez et al., "Voice Activity Detection. Fundamentals and Speech Recognition System Robustness", Robust Speech Recognition and Understanding, Jun. 2007, 24 pages.
(Continued)

*Primary Examiner* — Robert W Beausoliel, Jr.
*Assistant Examiner* — Cheryl M Shechtman
(74) *Attorney, Agent, or Firm* — Alston & Bird LLP

(57) ABSTRACT

A method comprising: enabling user definition of a search parameter; causing searching of content to find content having the search parameter and to provide the found content having the search parameter as search results; and causing rendering of the search results, using virtual reality, at different positions in a three dimensional space.

19 Claims, 5 Drawing Sheets

(51) Int. Cl.

| | |
|---|---|
| *G06F 3/04815* | (2022.01) |
| *G06F 3/0482* | (2013.01) |
| *G06F 3/16* | (2006.01) |
| *G06T 19/00* | (2011.01) |
| *G06F 16/957* | (2019.01) |
| *G06T 19/20* | (2011.01) |
| *G10L 19/008* | (2013.01) |
| *H04R 1/40* | (2006.01) |
| *H04R 3/00* | (2006.01) |

(52) U.S. Cl.
CPC ............ *G06F 3/04815* (2013.01); *G06F 3/16* (2013.01); *G06F 16/957* (2019.01); *G06T 19/006* (2013.01); *G06T 19/20* (2013.01); *G06F 3/012* (2013.01); *G06T 2219/2004* (2013.01); *G10L 19/008* (2013.01); *H04R 1/406* (2013.01); *H04R 3/005* (2013.01)

(56) References Cited

U.S. PATENT DOCUMENTS

| | | | | |
|---|---|---|---|---|
| 2002/0059370 A1* | 5/2002 | Shuster | .................. | H04R 29/00 707/999.104 |
| 2003/0164827 A1* | 9/2003 | Gottesman | .............. | G06T 15/20 345/419 |
| 2009/0219224 A1* | 9/2009 | Elg | .................. | G06F 3/012 345/8 |
| 2014/0093187 A1* | 4/2014 | Yehezkel | ................ | G06F 3/013 382/305 |
| 2014/0232638 A1* | 8/2014 | Choi | ....................... | G06F 3/013 345/156 |
| 2014/0372957 A1* | 12/2014 | Keane | .................... | G06F 3/011 715/852 |
| 2015/0362733 A1* | 12/2015 | Spivack | .................. | G06F 3/016 345/633 |
| 2016/0299563 A1* | 10/2016 | Stafford | .................. | G06F 3/011 |
| 2016/0350609 A1* | 12/2016 | Mason | .................. | G06T 19/003 |
| 2017/0264936 A1* | 9/2017 | Depies | .................. | G06T 19/006 |

FOREIGN PATENT DOCUMENTS

| | | |
|---|---|---|
| WO | 2014/204755 A1 | 12/2014 |
| WO | 2016/001909 A1 | 1/2016 |

OTHER PUBLICATIONS

Kinnunen et al., "An Overview of Text-Independent Speaker Recognition: from Features to Supervectors", Speech Communication, vol. 52, No. 1, Jul. 1, 2009, pp. 1-30.

Extended European Search Report received for corresponding European Patent Application No. 16165856.2, dated Oct. 7, 2016, 9 pages.

Nakazato et al., "3D MARS: Immersive Virtual Reality for Content-Based Image Retrieval", IEEE International Conference on Multimedia and Expo, Aug. 22-25, 2001, pp. 45-48.

International Search Report and Written Opinion received for corresponding Patent Cooperation Treaty Application No. PCT/FI2017/050265, dated Sep. 4, 2017, 12 pages.

Office action received for corresponding Indonesian Patent Application No. PID201808231, dated Apr. 14, 2020, 2 pages of office action and 2 pages of translation available.

Office action received for corresponding European Patent Application No. 16165856.2, dated Mar. 9, 2021, 6 pages of office action.

* cited by examiner $\theta_2 - \theta_1 = \alpha_2 - \alpha_1 = \Delta$

CONTENT SEARCH

RELATED APPLICATION

This application was originally filed as Patent Cooperation Treaty Application No. PCT/FI2017/050265 filed Apr. 12, 2017 which claims priority benefit to EP Patent Application No. 16165856.2, filed Apr. 18, 2016.

TECHNOLOGICAL FIELD

Embodiments of the present invention relate to content search. In particular, they relate to controlling audio rendering of an artificial sound scene, comprising multiple sound objects, to assist in content search.

BACKGROUND

It is desirable to allow a user to perform a search of content to find content the user wishes to have rendered visually, aurally or both visually and aurally.

BRIEF SUMMARY

According to various, but not necessarily all, embodiments of the invention there is provided a method comprising: enabling user definition of a search parameter; causing searching of content to find content having the search parameter and to provide the found content having the search parameter as search results; and causing rendering of the search results, using virtual reality, at different positions in a three dimensional space.

In some but not necessarily all examples, causing the rendering of the search results, using virtual reality, at different positions in the three dimensional space, comprises causing rendering of each of multiple different sound objects, using audio virtual reality, at a different position in the three dimensional space.

According to various, but not necessarily all, embodiments of the invention there is provided examples as claimed in the appended claims.

Examples of the present invention relate to content search. In particular, some examples relate to controlling audio rendering of an artificial sound scene, comprising multiple sound objects, to assist in content search.

BRIEF DESCRIPTION

For a better understanding of various examples that are useful for understanding the detailed description, reference will now be made by way of example only to the accompanying drawings in which:

FIG. 1 illustrates an example of a system and also an example of a method for recording and encoding a sound scene;

FIG. 2 schematically illustrates relative positions of a portable microphone (PM) and static microphone (SM) relative to an arbitrary reference point (REF);

DETAILED DESCRIPTION

Figure 1:
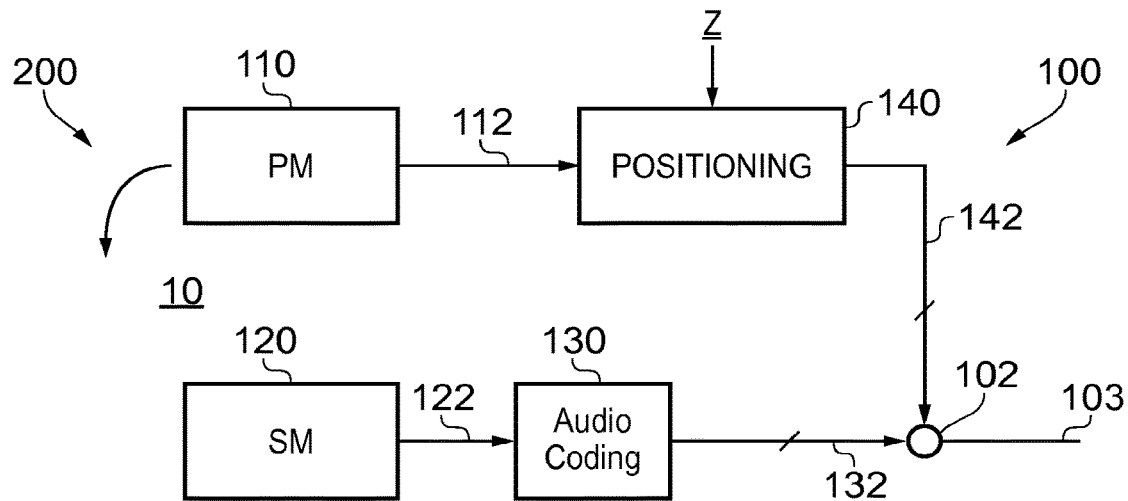

"Virtual reality" in this document refers to a form of mediated reality in which a user experiences a fully artificial environment (a virtual space) as a virtual scene, rendered by an apparatus to a user. The virtual scene is determined by an orientation of a perceiver within the virtual space and a field of perception.

Visual virtual reality is a form of virtual reality in which a user experiences visually a fully artificial environment (a virtual visual space) as a virtual scene (a virtual visual scene), comprising visual elements, displayed by an apparatus to a user. The virtual scene is determined by a point of view within the virtual space and a field of view. Displaying the virtual scene means providing it in a form that can be seen or perceived as seen by the user.

Audio virtual reality is a form of virtual reality in which a user experiences audibly a fully artificial environment (a virtual audio space) as a virtual scene (a virtual audio scene), comprising sound objects, rendered by an apparatus to a user. The virtual scene is determined by an orientation within the virtual space and a field of hearing.

Multi-media virtual reality is a form of virtual reality in which a user experiences both visual virtual reality and audio virtual reality simultaneously. The visual virtual reality and audio virtual reality are synchronised in time and space. A visual element and a sound object associated with the visual element are co-located in the same virtual space. The user experiences visually a fully artificial environment (a virtual visual space) as a virtual scene (a virtual visual scene), comprising visual elements, displayed by an apparatus to a user and experiences audibly a fully artificial environment (a virtual sound space) as a virtual scene (a virtual audio scene), comprising sound objects, rendered by the same or different apparatus to the user. The virtual visual space and the virtual sound space are aligned and in register so that each sound object may be represented within the virtual space/scene using a different visual element at the correct position visually and audibly. The virtual visual scene and virtual audio scene are rendered simultaneously and are determined by an orientation of the user within the common virtual space.

A sound scene in this document is used to refer to the arrangement of sound sources in a three-dimensional space. When a sound source changes position, the sound scene changes. When the sound source changes its audio properties such as its audio output, then the sound scene changes.

A rendered sound scene may reproduce a recorded sound scene with or without modification or a rendered sound scene may be an artificial sound scene.

A sound scene may be defined in relation to its creation. For example a sound scene may be a recorded sound scene that is created by recording a sound scene that may comprise multiple sound objects within the sound scene. For example, a sound scene may be an artificial or virtual audio scene created by audio processing and not formed by recording a sound scene. The audio processing selects the sound objects for inclusion within the artificial sound scene and positions the sound objects within the artificial sound scene.

A recorded sound scene at a time t comprises the sound objects present at time t, at their respective positions at time t within the sound scene and with their respective audio properties at time t. The sound objects within the recorded sound scene share a common space-time reference frame.

The sound objects in an artificial sound scene for virtual reality (virtual audio scene) do not necessarily share a common space-time reference frame. Each sound object may be independent of the other sound objects in the artificial sound scene (virtual audio scene), that is the sound object may be defined in relation to its own space-time reference frame that is independent of the space-time reference frame of another sound object in the artificial sound scene (virtual audio scene).

An artificial sound scene (virtual audio scene) may therefore be used to de-couple sound objects from time and space so that the presence and position of a sound object at a particular time in an artificial sound scene is independent of whether or not it is present and where it is positioned at the particular time in a recorded sound scene. The presence and position of a sound object within an artificial sound scene may therefore be based upon some other parameter such as a search parameter. For example, each sound object in an artificial sound scene (virtual audio scene) may share a common parameter such as, for example, the presence of a particular sound source.

It may therefore be convenient to represent the results of a search defined by a search parameter by rendering within an artificial sound scene (virtual audio scene) at least some of the sound objects that share the search parameter and not rendering within the artificial sound scene at least some of the sound objects that do not share the search parameter.

It will be understood that some form of fuzzy logic may be used to determine whether or not a sound object 'has' a particular search parameter. It may be convenient to represent the results of a search defined by the particular search parameter by rendering within the artificial sound scene only the sound objects that have the particular search parameter and not rendering within the artificial sound scene any of the sound objects that do not have the particular search parameter.

It will be understood that a search parameter may be a single condition or multiple conditions combined using logical expressions e.g. AND, OR, NOT etc Where a search results in an artificial sound scene comprising multiple sound objects, each sound object may, for example, represent a recorded sound scene. Selecting a particular sound object within the artificial sound scene may result in the rendering of a portion of the recorded sound scene represented by the selected sound object.

In some examples, when a sound scene is recorded an associated visual scene (still image or video) may also be recorded. The associated visual scene may, for example, record an image of the recorded sound scene from different perspectives at the same time from the same location. These images may be combined to create a panoramic image of the recorded sound scene (a virtual visual scene) that enables visual virtual reality in addition to audio virtual reality. The panoramic image may be a 360 degree panoramic image. Where a search results in an artificial sound scene comprising multiple sound objects, each sound object may, for example, represent an associated recorded visual scene (still image or video). Selecting a particular sound object within the artificial sound scene may result in the rendering of a portion of the recorded video scene associated with the selected sound object.

A sound object within a sound scene may be a source sound object that represents a sound source within the sound scene or may be a recorded sound object which represents sounds recorded at a particular microphone. In this document, reference to a sound object refers to both a recorded sound object and a source sound object. However, in some examples, the sound object(s) may be only source sound objects and in other examples the sound object(s) may be only recorded sound objects.

By using audio processing it may be possible, in some circumstances, to convert a recorded sound object into a source sound object and/or to convert a source sound object into a recorded sound object.

It may be desirable in some circumstances to record a sound scene using multiple microphones. Some microphones, such as Lavalier microphones, or other portable microphones, may be attached to or may follow a sound source in the sound scene. Other microphones may be static in the sound scene.

The combination of outputs from the various microphones defines a recorded sound scene comprising multiple sound objects. It may be desirable to parameterize the sound objects to enable searching of recorded sound scenes.

FIG. 1 illustrates an example of a system 100 and also an example of a method 200. The system 100 and method 200 record a sound scene 10 and process the recorded sound scene to enable an accurate rendering of the recorded sound scene as a rendered sound scene for a listener at a particular position (the origin) within the recorded sound scene 10.

In this example, the origin of the sound scene is at a microphone 120. In this example, the microphone 120 is static. It may record one or more channels, for example it may be a microphone array.

In this example, only a single static microphone 120 is illustrated. However, in other examples multiple static microphones 120 may be used independently. In such circumstances the origin may be at any one of these static microphones 120 and it may be desirable to switch, in some circumstances, the origin between static microphones 120 or to position the origin at an arbitrary position within the sound scene.

The system 100 also comprises one or more portable microphones 110. The portable microphone 110 may, for example, move with a sound source within the recorded sound scene 10. The portable microphone may, for example, be an 'up-close' microphone that remains close to a sound source. This may be achieved, for example, using a boom microphone or, for example, attaching the microphone to the sound source, for example, by using a Lavalier microphone. The portable microphone 110 may record one or more recording channels.

In some examples, an image sensor may be positioned at the static microphone 120. The digital image sensor may be configured to operate as a camera. Such a camera may be operated to record static images and/or video images.

In some, but not necessarily all embodiments, cameras may be configured to record overlapping fields of view so that a panoramic image may be created by combining the overlapping fields of view. In some examples, the panoramic view may be a 360 degree panoramic view.

One or more of the cameras may be configured in a stereoscopic or other spatially distributed arrangement so that the same portion of the sound scene is viewed from different offset perspectives. This may enable the creation of a three-dimensional image and/or processing to establish depth, for example, via the parallax effect.

A panoramic image enables virtual reality. The user visually experiences an environment recorded by the camera(s) (a virtual visual space) as a virtual scene (a current field of view within the panorama) displayed by an apparatus to a user. The virtual scene is determined by a point of view within the virtual space and a field of view. Changing the point of view changes the location of the field of view within the panorama. Displaying the virtual scene means providing it in a form that can be seen by the user.

Figure 2:
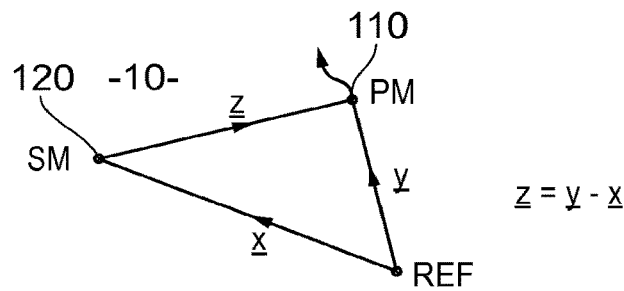

FIG. 2 schematically illustrates the relative positions of the portable microphone (PM) 110 and the static microphone (SM) 120 relative to an arbitrary reference point (REF). The position of the static microphone 120 relative to the reference point REF is represented by the vector x. The position of the portable microphone PM relative to the reference point REF is represented by the vector y. The relative position of the portable microphone PM 110 from the static microphone SM 120 is represented by the vector z. It will be understood that z=y−x. The vector z gives the relative position of the portable microphone 110 relative to the static microphone 120 which, in this example, is the origin of the sound scene 10. The vector z therefore positions the portable microphone 110 relative to a notional listener of the recorded sound scene 10. As the origin at the static microphone SM is static, the vector x is constant. Therefore, if one has knowledge of x and tracks variations in y, it is possible to also track variations in z, the relative position of the portable microphone 110 relative to the origin of the sound scene 10.

There are many different technologies that may be used to position an object including passive systems where the positioned object is passive and does not produce a signal and active systems where the positioned object produces a system. An example of a passive system, used in the Kinect™ device, is when an object is painted with a non-homogenous pattern of symbols using infrared light and the reflected light is measured using multiple cameras and then processed, using the parallax effect, to determine a position of the object. An example of an active system is when an object has a transmitter that transmits a radio signal to multiple receivers to enable the object to be positioned by, for example, trilateration. An example of an active system is when an object has a receiver or receivers that receive a radio signal from multiple transmitters to enable the object to be positioned by, for example, trilateration.

When the sound scene 10 as recorded is rendered to a user (listener) by the system 100 in FIG. 1, it is rendered to the listener as if the listener is positioned at the origin of the recorded sound scene 10. It is therefore important that, as the portable microphone 110 moves in the recorded sound scene 10, its position z relative to the origin of the recorded sound scene 10 is tracked and is correctly represented in the rendered sound scene. The system 100 is configured to achieve this.

In the example of FIG. 1, the audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannel audio signals 132 represent the sound scene 10 as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, 7.1 surround sound coding and in relation to the same common rendered sound scene.

The multichannel audio signals 132 from one or more the static microphones 120 are mixed by mixer 102 with a multichannel audio signals 142 from the one or more portable microphones 110 to produce a multi-microphone multichannel audio signal 103 that represents the recorded sound scene 10 relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin at static microphone 120. The positioning block 140 takes as an input the vector z or some parameter or parameters dependent upon the vector z. The vector z represents the relative position of the portable microphone 110 relative to the origin at the static microphone 120 in this example.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg($\underline{z}$)) of that portable microphone 110 relative to the origin at the static microphone 120.

The audio coding of the static microphone audio signals 122 to produce the multichannel audio signal 132 assumes a particular orientation of the rendered sound scene relative to an orientation of the recorded sound scene and the audio signals 122 are encoded to the multichannel audio signals 132 accordingly.

The relative orientation Arg(z) of the portable microphone 110 in the recorded sound scene 10 is determined and the audio signals 112 representing the sound object are coded to the multichannels defined by the audio coder 130 such that the sound object is correctly oriented within the rendered sound scene at a relative orientation Arg (z) from the listener. For example, the audio signals 112 may first be mixed or encoded into the multichannel audio signals 142 and then a transformation T may be used to rotate the multichannel audio signals 142, representing the moving sound object, within the space defined by those multiple channels by Arg(z).

Figure 4A:
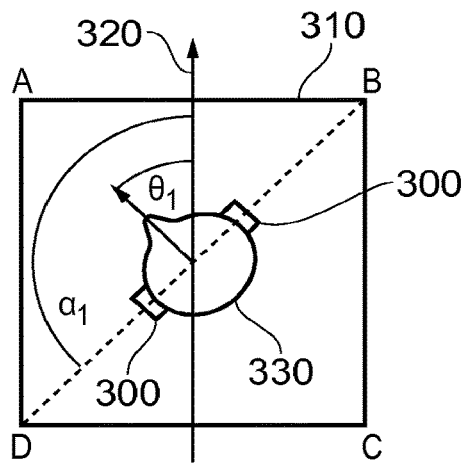
FIGS. 4A and 4B illustrate a change in relative orientation between a listener and the rendered sound scene so that the rendered sound scene remains fixed in space.
Figure 4B:
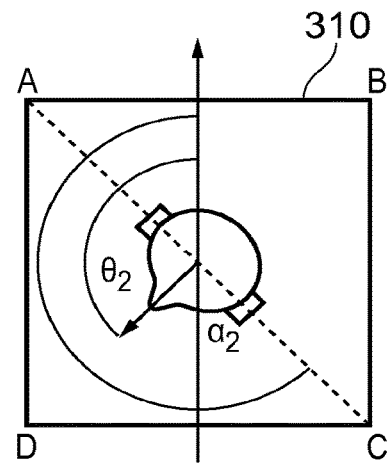

Referring to FIGS. 4A and 4B, in some situations, for example when the sound scene is rendered to a listener through a head-mounted audio output device 300, for example headphones using binaural audio coding, it may be desirable for the rendered sound scene 310 to remain fixed in space 320 when the listener turns their head 330 in space. This means that the rendered sound scene 310 needs to be rotated relative to the audio output device 300 by the same amount in the opposite sense to the head rotation.

In FIGS. 4A and 4B, the relative orientation between the listener and the rendered sound scene 310 is represented by an angle θ. The sound scene is rendered by the audio output device 300 which physically rotates in the space 320. The relative orientation between the audio output device 300 and the rendered sound scene 310 is represented by an angle α. As the audio output device 300 does not move relative to the user's head 330 there is a fixed offset between θ and α of 90° in this example. When the user turns their head θ changes. If the sound scene is to be rendered as fixed in space then α must change by the same amount in the same sense.

Moving from FIG. 4A to 4B, the user turns their head clockwise increasing θ by magnitude Δ and increasing a by magnitude Δ. The rendered sound scene is rotated relative to the audio device in an anticlockwise direction by magnitude Δ so that the rendered sound scene 310 remains fixed in space.

The orientation of the rendered sound scene 310 tracks with the rotation of the listener's head so that the orientation of the rendered sound scene 310 remains fixed in space 320 and does not move with the listener's head 330.

Figure 3:
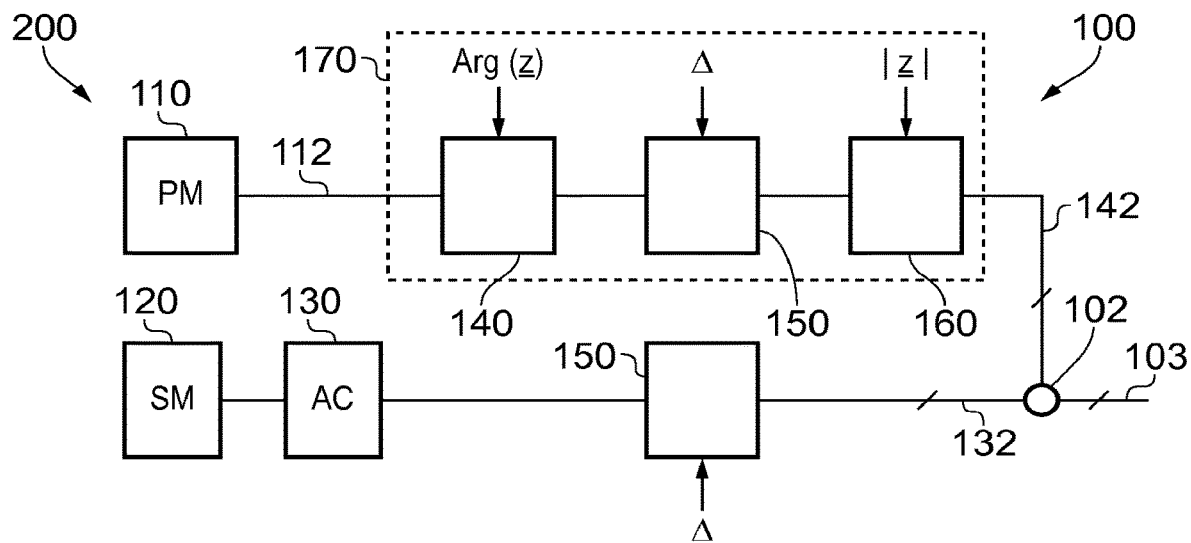
FIG. 3 illustrates a system as illustrated in FIG. 1, modified to rotate the rendered sound scene relative to the recorded sound scene.

FIG. 3 illustrates a system 100 as illustrated in FIG. 1, modified to rotate the rendered sound scene 310 relative to the recorded sound scene 10. This will rotate the rendered sound scene 310 relative to the audio output device 300 which has a fixed relationship with the recorded sound scene 10.

An orientation block 150 is used to rotate the multichannel audio signals 142 by Δ, determined by rotation of the user's head.

Similarly, an orientation block 150 is used to rotate the multichannel audio signals 132 by Δ, determined by rotation of the user's head.

The functionality of the orientation block 150 is very similar to the functionality of the orientation function of the positioning block 140.

The audio coding of the static microphone audio signals 122 to produce the multichannel audio signals 132 assumes a particular orientation of the rendered sound scene relative to the recorded sound scene. This orientation is offset by Δ. Accordingly, the audio signals 122 are encoded to the multichannel audio signals 132 and the audio signals 112 are encoded to the multichannel audio signals 142 accordingly.

The transformation T may be used to rotate the multichannel audio signals 132 within the space defined by those multiple channels by A. An additional transformation T may be used to rotate the multichannel audio signals 142 within the space defined by those multiple channels by A.

In the example of FIG. 3, the portable microphone signals 112 are additionally processed to control the perception of the distance D of the sound object from the listener in the rendered sound scene, for example, to match the distance |z| of the sound object from the origin in the recorded sound scene 10. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 5:
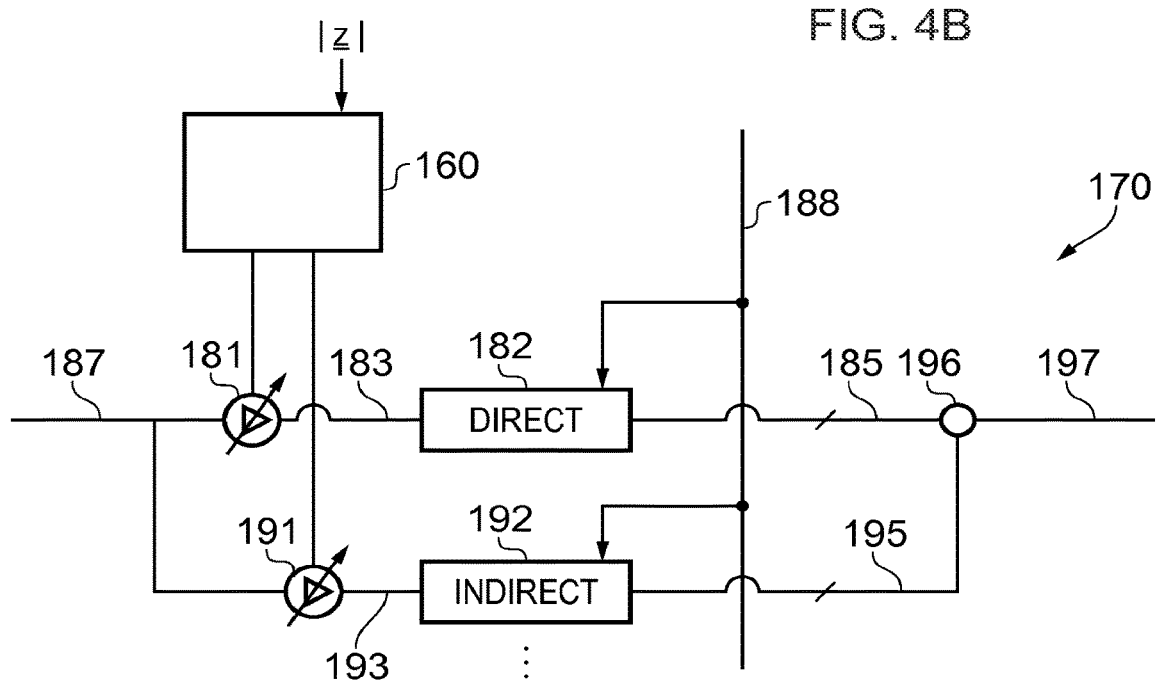
FIG. 5 illustrates a module which may be used, for example, to perform the functions of the positioning block, orientation block and distance block of the system.

FIG. 5 illustrates a module 170 which may be used, for example, to perform the functions of the positioning block 140, orientation block 150 and distance block 160 in FIG. 3. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signals 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear, to a listener, to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound scene 310.

Each of the parallel paths comprises a variable gain device 181, 191 which is controlled by the distance module 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the positioning block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the positioning block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg($z$) of the portable microphone 110 (moving sound object) in the recorded sound scene 10 and the orientation Δ of the rendered sound scene 310 relative to the audio output device 300.

The position of the moving sound object changes as the portable microphone 110 moves in the recorded sound scene 10 and the orientation of the rendered sound scene 310 changes as the head-mounted audio output device rendering the sound scene rotates.

Figure 6A:
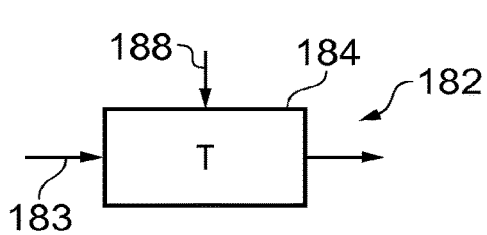
FIGS. 6A and 6B illustrate examples of a direct module and an indirect module for use in the module of FIG. 5.

The direct processing module 182 may, for example, include a system 184 similar to that illustrated in FIG. 6A that rotates the single channel audio signal, gain-adjusted input signal 183, in the appropriate multichannel space producing the direct multichannel audio signal 185.

The system 184 uses a transfer function to perform a transformation T that rotates multichannel signals within the space defined for those multiple channels by Arg($z$) and by Δ, defined by the direction of arrival signal 188. For example, a head related transfer function (HRTF) interpolator may be used for binaural audio. As another example, Vector Base Amplitude Panning (VBAP) may be used for loudspeaker format audio (such as 5.1).

Figure 6B:
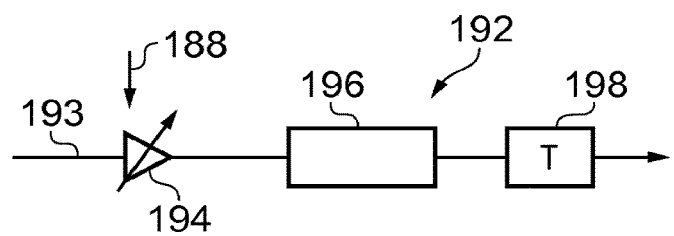

The indirect module 192 may, for example, be implemented as illustrated in FIG. 6B. In this example, the direction of arrival signal 188 controls the gain of the single channel audio signal, the gain-adjusted input signal 193, using a variable gain device 194. The amplified signal is then processed using a static decorrelator 196 and then a system 198 that applies a static transformation T to produce the output multichannel audio signals 195. The static decorrelator in this example use a pre-delay of at least 2 ms. The transformation T rotates multichannel signals within the space defined for those multiple channels in a manner similar to the system 184 but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg($z$) and/or distance |$z$|) of a sound object, represented by a portable microphone audio signal 112, from a listener in the rendered sound scene and (ii) changing the orientation of the rendered sound scene (including the sound object positioned according to (i)) relative to a rotating rendering audio output device 300.

It should also be appreciated that the module 170 may also be used for performing the function of the orientation module 150 only, when processing the audio signals 122 provided by the static microphone 120. However, the direction of arrival signal will include only Δ and will not include Arg($z$). In some but not necessarily all examples, gain of the variable gain devices 191 modifying the gain to the indirect paths may be put to zero and the gain of the variable gain device 181 for the direct path may be fixed. In this instance, the module 170 reduces to the system 184 illustrated in FIG. 6A that rotates the recorded sound scene to produce the rendered sound scene according to a direction of arrival signal that includes only Δ and does not include Arg($z$).

It will therefore be appreciated that the module 170 may control the position z of a sound object within a sound scene whether a recorded sound scene or an artificial sound scene. It may control orientation Arg($z$) of the sound object relative to an origin of the rendered sound scene and/or distance |$z$| of the sound object relative to the origin of the rendered sound scene.

It will therefore be appreciated that the module 170 may control the relative orientation θ of a rendered sound scene to a user.

Figure 7:
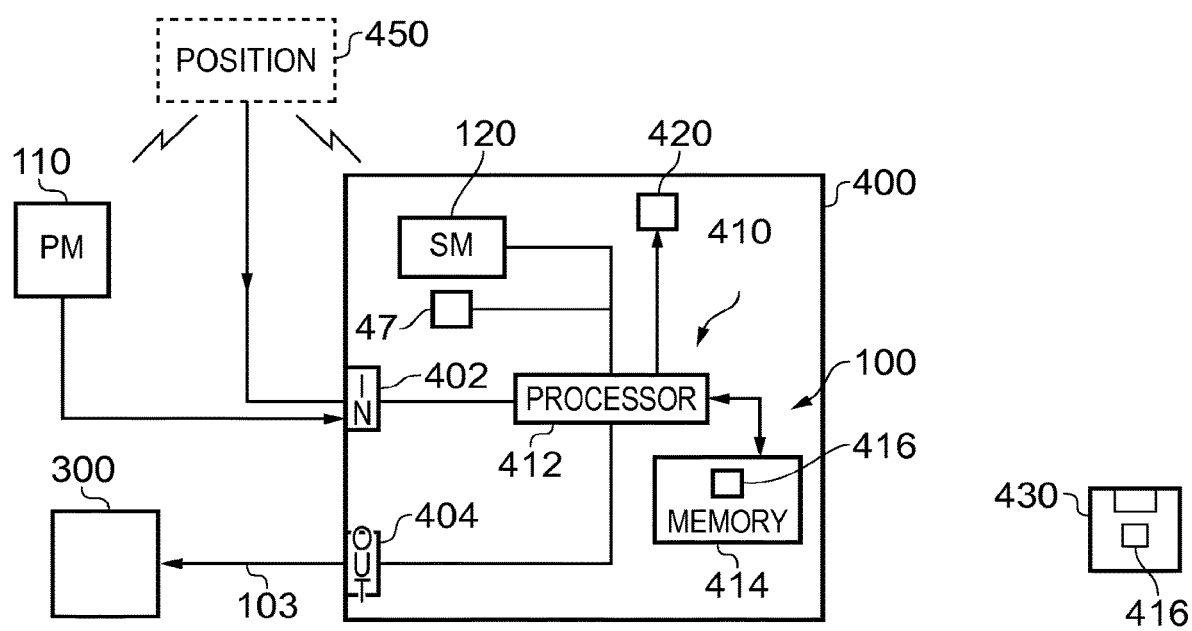
FIG. 7 illustrates an example of the system implemented using an apparatus.

FIG. 7 illustrates an example of the system 100 implemented using an apparatus 400. The electronic device 400 may, for example, be a static electronic device, a portable electronic device or a hand-portable electronic device that has a size that makes it suitable to carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated. This positioning system 450 is used to position the portable microphone(s) 110 relative to the origin of the sound scene e.g. the static microphone 120. In this example, the positioning system 450 is illustrated as external to both the portable microphone 110 and the apparatus 400. It provides information dependent on the position z of the portable microphone 110 relative to the origin of the sound scene to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

In some example, an image sensor 47 may be positioned at the static microphone 120. The digital image sensor may be configured to operate as a camera. Such a camera may be operated to record static images and/or video images In some, but not necessarily all embodiments, multiple cameras 47 may be present, configured to record overlapping fields of view so that a panoramic image may be created by combining the overlapping fields of view. In some examples, the panoramic view may be a 360 degree panoramic view. One or more of the cameras may be configured in a stereoscopic or other spatially distributed arrangement so that the same portion of the sound scene is viewed from different offset perspectives. This may enable the creation of a three-dimensional image and/or processing to establish depth, for example, via the parallax effect.

The apparatus 400 may comprise a display 420 for displaying images and/or may control a display 420 in another apparatus to display images.

The apparatus 400 wholly or partially operates the system 100 and method 200 described above to produce a multi-microphone multichannel audio signal 103.

The apparatus 400 provides the multi-microphone multi-channel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the camera(s) 47 (if any), static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 7. In some examples, the controller 410 may be required to process images from the camera(s) 47 and provide output data to the display 420.

Implementation of a controller 410 may be as controller circuitry. The controller 410 may be implemented in hardware alone, have certain aspects in software including firmware alone or can be a combination of hardware and software (including firmware).

As illustrated in FIG. 7 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-14 The processor 412 by reading the memory 414 is able to load and execute the computer program 416.

As illustrated in FIG. 7, the computer program 416 may arrive at the apparatus 400 via any suitable delivery mechanism 430. The delivery mechanism 430 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 416. The delivery mechanism may be a signal configured to reliably transfer the computer program 416. The apparatus 400 may propagate or transmit the computer program 416 as a computer data signal.

Although the memory 414 is illustrated as a single component/circuitry it may be implemented as one or more separate components/circuitry some or all of which may be integrated/removable and/or may provide permanent/semi-permanent/dynamic/cached storage.

Although the processor 412 is illustrated as a single component/circuitry it may be implemented as one or more separate components/circuitry some or all of which may be integrated/removable. The processor 412 may be a single core or multi-core processor.

Figure 8:
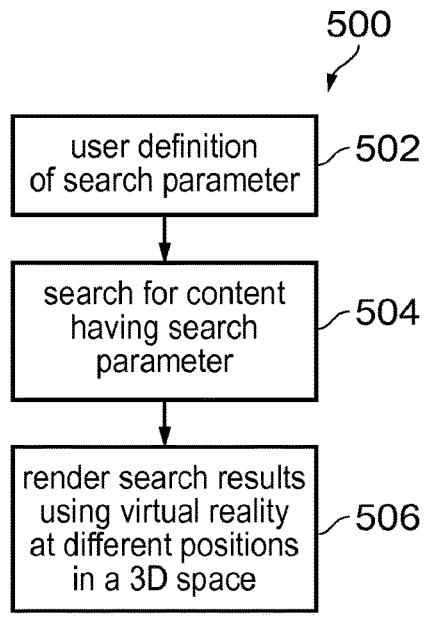
FIG. 8 illustrates an example of a method for enabling searching of content and for rendering the search results, using virtual reality, at different positions in a three dimensional space.

FIG. 8 illustrates an example of a method 500 for enabling searching of content and for rendering the search results, using virtual reality, at different positions in a three dimensional space.

At block 502, the method 500 comprises enabling user definition of a search parameter. Next, at block 504, the method 500 causes searching of content for content having the user-defined search parameter and provides the found content having the user-defined search parameter as search results. Then, at block 506, the method 500 causes rendering of the search results, using virtual reality, at different positions in a three dimensional space.

The results of the search defined by the user-defined search parameter are represented by rendering within a virtual scene at least some of the search results that have the user defined search parameter and not rendering within the virtual scene at least some of the search results that do not share the search parameter. It will be understood that a search parameter may be a single condition or multiple combined conditions, combined using, for example, logical expressions, e.g. AND, OR, NOT, etc.

It will also be understood that some form of fuzzy logic may be used to determine whether or not a search result "has" a particular search parameter and the results of the search may then be presented by rendering within the virtual scene only the search results that have the particular search parameter and not rendering within the virtual scene any of the search results that do not have the particular search parameter.

Where a search produces a virtual scene comprising multiple search results, each search result may, for example, represent a recorded sound scene. User selection of a particular search result within the virtual scene may result in the rendering of a portion of the recorded sound scene represented by the selected search result.

In some examples, when a sound scene is recorded an associated visual scene (still image or video) may also be recorded. The associated visual scene may, for example, record an image of the recorded sound scene from different perspectives at the same time from the same location. These images may be combined to create a panoramic image of the recorded sound scene (a virtual visual scene) that enables visual virtual reality in addition to audio virtual reality. The panoramic image may be a 360° panoramic image. Where a search produces a virtual scene comprising multiple search results, each search result may, for example, represent a recorded sound scene and/or a recorded visual scene. Selecting a particular search result within the artificial sound scene may result in the rendering of a portion of the recorded scene (sound scene and/or visual scene) represented by the selected search result.

Figure 9:
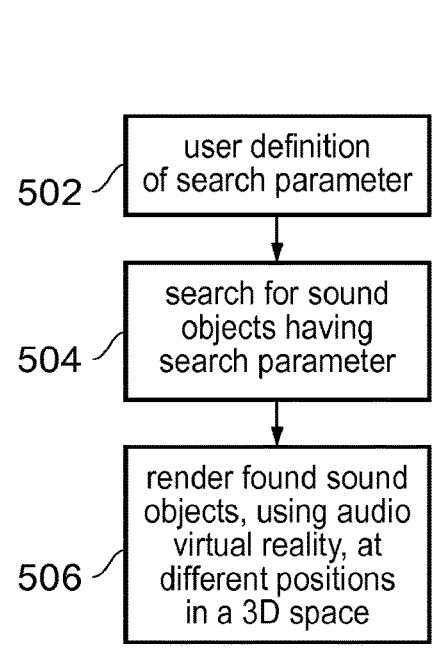
FIG. 9 illustrates another example of the method illustrated in FIG. 8, in which the search for content comprises searching for sound objects having the user-defined search parameter and the rendering of the search results comprises rendering the found sound objects, using audio virtual reality, at different positions in the three dimensional space.

FIG. 9 illustrates another example of the method 500 illustrated in FIG. 8. In this example, the search for content comprises searching for sound objects having the user-defined search parameter and the rendering of the search results comprises rendering the found sound objects, using audio virtual reality, at different positions in the three dimensional space.

At block 502, the method 500 comprises enabling user-definition of a search parameter. Then, at block 504, the method 500 comprises causing searching of sound objects to find sound objects having the search parameter. Then, at block 506, the method 500 comprises causing rendering of each of the found sound objects, having the search parameter, using audio virtual reality, at different positions in the three dimensional space. Each of the multiple different found sound objects is rendered at a different position in the three dimensional space.

The results of the search defined by the search parameter are presented by rendering within a virtual audio scene at least some of the found sound objects that have the search parameter and not rendering within the virtual audio scene at least some of the sound objects that do not have the search parameter. It will be understood that a search parameter may be a single condition or multiple combined conditions, combined using, for example logical expressions, e.g. AND, OR, NOT, etc.

It will be understood that some form of fuzzy logic may be used to determine whether or not a sound object "has" a particular search parameter and the result of the search may be represented by rendering within the virtual audio scene only the found sound objects that have the particular search parameter and not rendering within the virtual audio scene any sound objects that do not have the particular search parameter.

Where a search produces a virtual audio scene comprising multiple found sound objects, each found sound object may, for example, represent a recorded sound scene. User selection of a particular found sound object within the virtual audio scene may result in the rendering of a portion of the recorded sound scene represented by the selected sound object. In some examples, when a sound scene is recorded an associated visual scene (still image or video) may be recorded. The associated visual scene may, for example, record an image of the recorded sound scene from different perspectives at the same time from the same location. These images may be combined to create a panoramic image of the recorded sound scene (a virtual visual scene) that enables visual or virtual reality in addition to audio virtual reality. The panoramic image may be a 360° panoramic image.

Where a search produces a virtual audio scene comprising multiple found sound objects, each found sound object may, for example, represent a recorded sound scene and/or a recorded visual scene. Selecting a particular search result within the artificial sound scene may result in the rendering of a portion of the recorded scene (sound scene and/or visual scene) represented by the selected search result.

Figure 10:
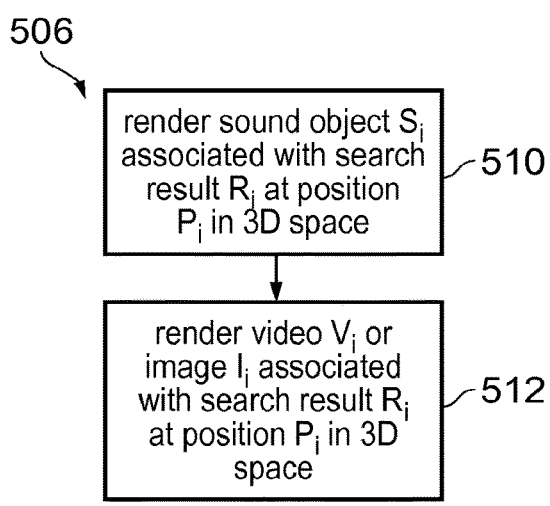
FIG. 10 illustrates an example of a rendering block as illustrated in FIG. 8 or FIG. 9.

FIG. 10 illustrates an example of a rendering block 506 as illustrated in FIG. 8 or FIG. 9. The rendering block 506 illustrated in FIG. 10 causes rendering using virtual reality of a single search result $R_i$. It should be appreciated that this block will be repeated for each of the different search results $R_i$ causing the rendering of each different search result $R_i$ at a different position $p_i$ within the three dimensional space.

At block 510, the method causes rendering of a sound object $S_i$ associated with a search result $R_i$ at a position $p_i$ in the three dimensional space using audio virtual reality.

Then at block 512, the method causes rendering of a video $V_i$ or an image $I_i$ associated with the search result $R_i$ at a position $p_i$ in the three dimensional space using visual virtual reality.

The position $p_i$ at which the sound object $S_i$ is rendered and the position $p_i$ at which the video $V_i$ or image $I_i$ is rendered is the same position. The sound object $S_i$ and the video $V_i$ or image $I_i$ are rendered simultaneously at the position $p_i$ in the three dimensional space. In this way, the method provides multi-media virtual reality.

Figure 11:
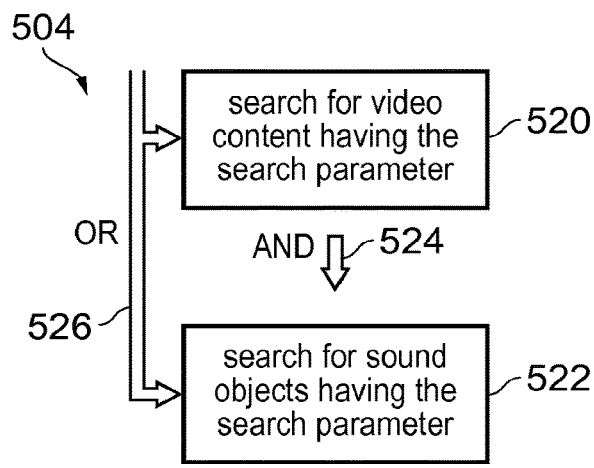
FIG. 11 illustrates an example of a search block as illustrated in FIG. 8 or FIG. 9.

FIG. 11 illustrates an example of the search block 504 previously described in relation to FIGS. 8 and 9. In this example, search block 504 comprises sub-blocks 520 and 522. The video sub-block 520 enables searching of video content to find videos having the user-defined search parameter. The audio sub-block 522 enables audio searching to find sound objects having the user-defined search parameter.

In the example of FIG. 8, the search block 504 may be implemented, for example, by performing either one of blocks 520 and 522 or by performing both the blocks 520 and 522 in parallel 526 or in series 524. The search may therefore be a video search, or the search may be an audio search, or the search may be the union of a video search and an audio search or the search may be the intersection of a video search and an audio search.

In the example of FIG. 9, the block 504 may perform only an audio search using the audio sub-block 522 or may initially perform a video search using the video sub-block 520 and then perform the audio search using the audio sub-block 522.

It will therefore be appreciated that the search block 504 may perform a multi-stage search of content to find content having the search parameter and to provide the found content having the search parameter as search results for rendering using virtual reality. For example, a first stage of the search may comprise searching of video content to find video content having the search parameter and providing the found video content having the search parameter as intermediate results. The second stage of the search may then comprise searching of the intermediate search results to find sound objects, defined within the found video content, having the search parameter and providing the found sound objects having the search parameter as final search results, and causing rendering of the final search results at block 506, using virtual reality, at different positions in the three dimensional space.

In order to enable the searching of video or images it may be necessary to parameterize the video or images. This may, for example, be achieved by using image processing. It may, for example, be possible to use image processing to identify whether or not a particular face is present within an image or a video by using existing image recognition techniques such as principal component analysis. It may also be possible to use image processing to identify other items or objects within an image or a video using for example feature extraction from the image or video and using pattern matching of the extracted features. Other techniques exist for performing image recognition within a still image or a video image and these may also be used. It is also possible to parameterize images and videos by manually annotating a video or image using for example metadata comprising the parameters.

In this way it is possible to parameterize images and video either in advance or in real time to enable the images and video to be searched using a user-defined parameter.

In order to perform a search of the sound objects, it is also necessary to parameterize the sound objects. The parameterization of the sound object may also be achieved by using digital processing by, for example, recognizing speech of a user within a sound object or by recognizing some other sound within the sound object.

In order to enable the searching of sound objects it may be necessary to parameterize the sound objects. This may, for example, be achieved by using audio processing. It may, for example, be possible to use speech recognition to identify whether or not a particular person is speaking in a sound object. It may, for example, be possible to use spectral analysis to identify particular sounds in a sound object. Furthermore, it may be possible to categorize the sound object based on spectral or other parameters. Example categories include different human sounds such as laughing, singing, or footsteps, animal sounds such as a cat meow, nature sounds such as rainfall, and the like. It may also be possible to recognize the identity of a person based on spectral and other features and voice models trained with speech utterances from the recognized persons. It may also be possible to compare the similarity of sound objects, without categorizing them, by calculating a distance or similarity measure between spectral or other features extracted from sound clips. Example of this includes calculating a spectral distortion measure such as the log spectral distortion between the spectra of two sounds. It is also possible to parameterize sound objects by manually annotating a sound object using for example metadata comprising the parameters. In this way it is possible to parameterize sound objects either in advance or in real time to enable the sound objects to be searched using a user-defined parameter.

Figure 12A:
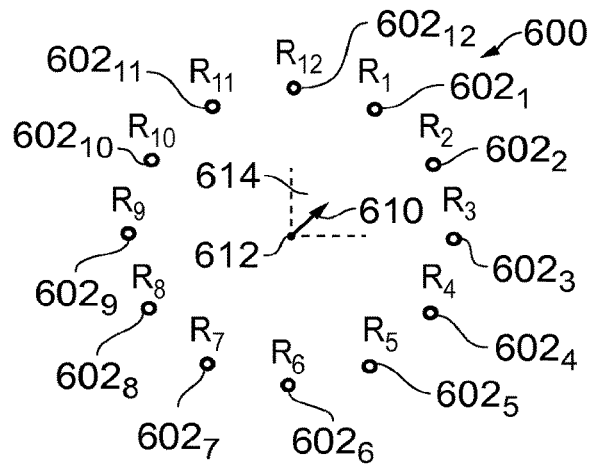
FIGS. 12A and 12B illustrate the rendering of the search results as virtual elements at different positions in a three dimensional virtual space using virtual reality, for different user orientations.
Figure 12B:
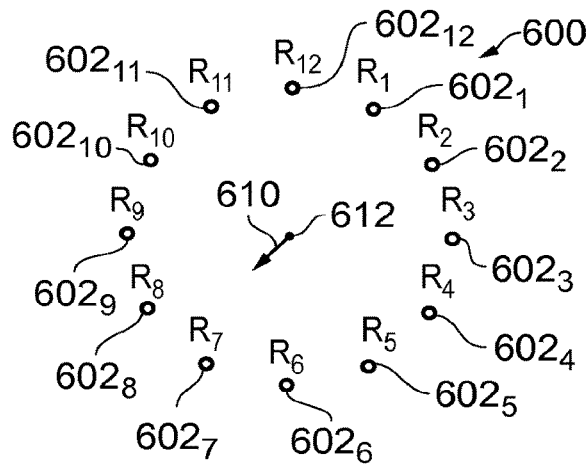

FIGS. 12A and 12B illustrate the rendering of the search results $R_i$ as virtual elements 602 at different positions in a three dimensional virtual space 600 using virtual reality. Each of the multiple virtual elements 602 illustrated at different positions may be referenced by a different index i, e.g. as virtual element $602_i$ at position $p_i$ (not illustrated). The three dimensional virtual space 600 is a fully artificial environment rendered by the apparatus 400 to a user.

The virtual elements 602 illustrated are associated in that they are a set of search results defined by having a common user-defined search parameter but they are otherwise independent.

The position $p_i$ of a virtual element $602_i$ representing a search result $R_i$ in the three dimensional virtual space 600 may be entirely independent of the search result $R_i$ itself. That is, the positions $p_i$ of the virtual elements 602 within the three dimensional virtual space 600 are controlled to distribute the search results $\{R_i\}$ so that they may be easily browsed and the positions $\{p_i\}$ of the search results $\{R_i\}$ within the three dimensional virtual space 600 may not have any meaning.

The audio and/or visual representation $A_i$ of a virtual element $602_i$ representing a search result $R_i$ in the three dimensional virtual space 600 may be entirely independent of the search result $R_i$ itself or may be dependent upon the search result $R_i$. The appearance $A_i$ of the virtual elements 602 within the three dimensional virtual space 600 may be controlled to differentiate the search results $\{R_i\}$ so that they may be easily browsed.

A user experiences a virtual scene determined by an orientation 610 of the user within the virtual space 600 and a field of perception 614 of the user.

The virtual space 600 may be, for example, a virtual audio space and the virtual reality may be audio virtual reality. In this example, the virtual elements 602 are rendered sound objects $\{S_i\}$ representing search results $\{R_i\}$. That is, each search result $R_i$ is a rendered sound object $S_i$. In some examples, all the sound objects $\{S_i\}$ are simultaneously rendered and in other examples only the sound objects $\{S_i\}$ that lie within the field of perception 614 of the user are simultaneously rendered.

In other examples the virtual space 600 may be a virtual multi-media space that is both a virtual audio space and a virtual visual space. The virtual reality may be multi-media virtual reality. The virtual elements 602 representing search results $\{R_i\}$, in this example, are rendered sound objects $S_i$ and/or rendered visual elements $v_i$. Each of the search results $R_i$ is a sound object $S_i$ and/or a visual element $v_i$ representing an image $I_i$ or video $V_i$, for example a low resolution, small sized version of the image $I_i$ or video $V_i$. In some examples, all the sound objects $\{S_i\}$ and/or visual element are simultaneously rendered and in other examples only the sound objects $\{S_i\}$ and/or visual elements that lie within the field of perception 614 of the user are simultaneously rendered.

Each of the search results $R_i$ has a particular position $p_i$ within the three dimensional virtual space 600. Such a position $p_i$ may be defined using any convenient co-ordinate system. For example, using a cylindrical co-ordinate system with an axis passing through the position 612 of the user, the position $p_i$ of a search result $R_i$ within the virtual space 600 may be defined using a triplet of an axial distance, an azimuthal angle about the axis and a radial distance orthogonal to the axis. Different search results $R_i$ have at least different azimuthal angles and may additionally have different radial distances and/or different axial distances. As another example, a position $p_i$ of the search result $R_i$ may be defined using a spherical co-ordinate system that has a polar axis passing through the position 612 of the user. A position $p_i$ of a search result $R_i$ in the virtual space 600 may be defined using a triplet of a polar angle measured from the polar axis, an azimuthal angle measured about the polar axis and a radial distance. The different search results $R_i$ have at least different azimuthal angles and may additionally have different radial distances and/or different polar angles.

It will therefore be appreciated that the different search results $R_i$ may be distributed throughout the three dimensional virtual space 600 so that they are all visible and/or audible to a user at position 612 should the user orient 610 themselves in particular directions.

It will therefore be appreciated that a user may browse the search results $\{R_i\}$ by changing at least the orientation 610 of the user within the virtual space 600. This may be conveniently achieved by using, for example, a head-mounted device that tracks movement of the head.

The system 100 (apparatus 400) enables browsing of the search results $R_i$, rendered using virtual reality at different positions $p_i$ in the three dimensional space 600, by detecting an orientation 610 of the user in the three dimensional space 600. When the orientation 610 of the user in the three dimensional space 600 corresponds to a position $p_i$ at which a search result $R_i$ is rendered, the user has browsed to that search result $R_i$. When the user has browsed to a search result $R_i$, the system 100 may automatically change rendering of the search result $R_i$ at position $p_i$, using virtual reality, to signify to the user that the user has browsed to this search result $R_i$.

For example in FIG. 12A the user is oriented 610 towards the search result $R_1$ and the virtual element $602_1$ representing the search result $R_1$ has a different characteristic compared to the other virtual elements 602 (indicated by solid shading).

In the example of FIG. 12B, the user has changed orientation and is now oriented towards the search results $R_7$ represented by a virtual element $602_7$ and the characteristics of the virtual element 602 has been modified compared to the other virtual elements 602 to indicate that the user has browsed to this search result $R_7$.

The system 100 (apparatus 400) may therefore automatically change rendering of a search result $R_i$ at a position $p_i$, using virtual reality when the user browses to that search result. For example, if the search result $R_i$ is represented by a sound object $S_i$ as the virtual element $602_i$, then a characteristic of the sound object $S_i$ may change, for example the volume of the audio output associated with the rendered sound object $R_i$ may be increased. If the virtual element $602_i$ associated with the search result $R_i$ is a visual image, e.g. an image or a video, then a characteristic of the image or video may be changed, for example, a field of view or resolution of the image or video may be changed.

In some examples, the rendering of a search result $R_i$ may change in dependence upon a time duration for which a user has browsed to a search result $R_i$. For example, while a user is oriented 610 towards a search result $R_i$ represented by a sound object $S_i$ as the virtual element $602_i$, the volume of the audio associated with that sound object $S_i$ may continue to increase while the user remains oriented towards that sound object $S_i$ until a predetermined level. If the virtual element $602_i$ is an image or a video, then while the user is oriented 610 towards the virtual element $602_i$ then a characteristic of the image or video may continue to change while the user remains oriented towards that virtual element $602_i$, for example, the field of view or resolution may continue to increase to a predetermined limit.

In some embodiments, a virtual element $602_i$ (search result $R_i$) may be selected as a consequence of the user orientating 610 themselves towards that virtual element $602_i$ for a predetermined period of time or as a consequence of performing a gesture or some other user action while they are oriented 610 towards that virtual element $602_i$. The selection of a search result $R_i$ may, for example, result in the rendering of content associated with that search result which may be, for example, comprise entirely replacing the virtual space 600 representing the search results {Ri} with a different space representing mediated reality content associated with the selected search result. That is, the system 100 switches from a search mode to a playback mode and plays back the content associated with the selected search result, using augmented or virtual reality.

Figure 13A:
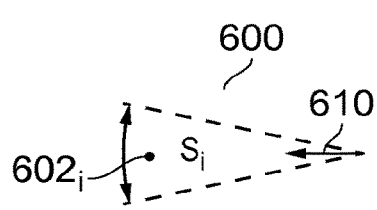
FIGS. 13A, 13B and 13C illustrate an example in which a user is oriented towards a search result represented by a virtual element for an extended period of time.
Figure 13B:
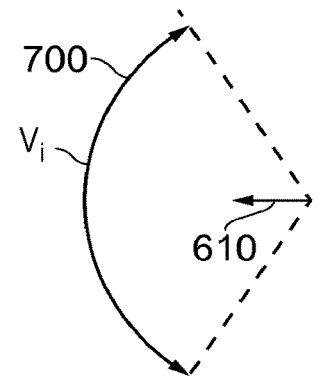
Figure 13C:
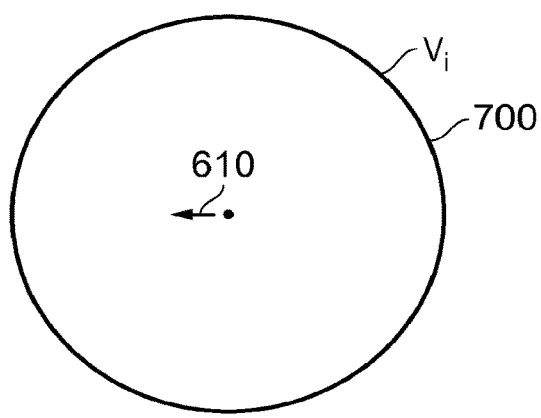

FIGS. 13A and 13B and 13C illustrate an example in which a user is oriented 610 towards a search result $S_i$ represented by a virtual element $602_i$. In this example the virtual element $602_i$ comprises an image $I_i$ for video $V_i$.

Referring to FIG. 13A, when a user initially looks towards a particular search result $R_i$ at a particular position p in the three dimensional space 600, the method initially causes rendering of a sound object $S_i$ associated with the particular search result $R_i$, using audible virtual reality at the same position $p_i$ in the three dimensional space 600. The user is therefore able to hear the audio content of the sound object $S_i$ associated with the search result $R_i$.

Then, if the user continues to look towards the particular search result $R_i$ at the particular position $p_i$ in the three dimensional space 600, the method causes display of an image $I_i$ or video $V_i$, associated with the particular search result $R_i$ using visual virtual reality at the same position $p_i$ in the three dimensional space 600. It also causes rendering of the sound objects associated with the displayed image or video including the sound object $S_i$ associated with the search result $R_i$.

As illustrated in FIG. 13B, if the user continues to look towards the particular search results $R_i$ at the particular position $p_i$ in the three dimensional space 600, the method causes continued display of the image $I_i$ or the video $V_i$, associated with the particular search result $R_i$, using visual virtual reality, at the same particular position $p_i$ in three dimensional space 600 with an increasing available field of view 700. It also causes rendering of the sound objects associated with the image or video displayed in the increasing available field of view 700, including the sound object $S_i$ associated with the search result $R_i$, In the example illustrated, the video $V_i$ associated with the search result $R_i$ to which the user is oriented expands widthwise and heightwise to occupy the user's field of view. As illustrated in FIG. 13C, it may also extend beyond the user's field of view to completely surround the user and to replace the virtual space 600 defined for the search results with a virtual space defined by the panoramic video $V_i$, associated with the particular search result $R_i$. While the field of view of the video $V_i$ is expanding, the sound object $S_i$ associated with the search result $R_i$ continues to produce audio output. As the expanding field of view of the video $V_i$ increases then additional sound objects associated with that video will be rendered within the virtual space. In this way the visual and audio virtual reality defined by the search result $R_i$ slowly expands from a narrow field of perception represented by the virtual element $602_i$ for search result $R_i$ to cause playback of the search results $R_i$ first with a narrow field of perception using audio only, then with a narrow field of perception using audio and video and then with an increasing available field of perception using audio and video until the available field of perception eventually expands to completely surround the user at which point full mediated reality playback of the search results $R_i$ is initiated and the user can move within the space represented by video $V_i$ by changing the user orientation 610. The initiation of mediated reality playback may be indicated to the user. The user is now able to look around the virtual space defined by the video $V_i$ and its associated sound objects by moving the user's head or changing the user's orientation within the defined virtual space.

Figure 14:
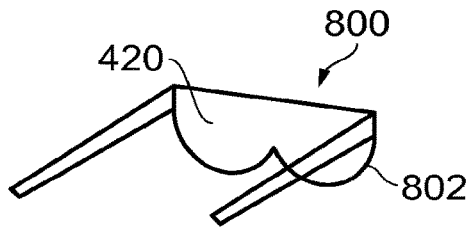
FIG. 14 illustrates an example of a head-mounted apparatus comprising a display for virtual reality.

FIG. 14 illustrates an example of a head-mounted apparatus 800 comprising the display 420 that displays images to a user. The apparatus 800 may be moved automatically when the head of a user moves.

In some examples, the head-mounted apparatus 800 may also provide the functionality of the head-mounted audio output device 300.

The head-mounted apparatus 800 may, for example, be operated as a see-video arrangement for virtual reality that enables visual elements 602 of the virtual space 600 to be displayed by the display 420 for viewing by the user. In this case the visor 802 is opaque and may be used as display 420.

The foregoing description describes a system 100 and method 200 that can position a sound object within a rendered sound scene and can rotate the rendered sound scene. The inventors have realized that the system 100 may also be used to change the rendered sound scene to assist with editing of the sound scene.

The method 500 may, for example, be performed by the system 100, for example, using the controller 410 of the apparatus 400.

It will be appreciated from the foregoing that the various methods 500 described may be performed by an apparatus 400, for example an electronic apparatus 400.

The electronic apparatus 400 may in some examples be a part of an audio output device 300 such as a head-mounted audio output device or a module for such an audio output device 300. The electronic apparatus 400 may in some examples additionally or alternatively be a part of a head-mounted apparatus 800 comprising the display 420 that displays images to a user.

It will be appreciated from the foregoing that the various methods 500 described may be performed by a computer program used by such an apparatus 400.

For example, an apparatus 400 may comprises:
at least one processor 412; and
at least one memory 414 including computer program code
the at least one memory 414 and the computer program code configured to, with the at least one processor 412, cause the apparatus 400 at least to perform:

enabling user definition of a search parameter;
causing searching of content to find content having the search parameter and to provide the found content having the search parameter as search results; and
causing rendering of the search results, using virtual reality, at different positions in a three dimensional space.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1-14 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code,
the at least one memory and the computer program code configured to, with the at least one processor, cause the apparatus to perform at least the following:
enable user definition of a search parameter, wherein the search parameter identifies a person;
cause searching of content to find content having audio or visual data associated with the person identified by the search parameter and to provide the found content having audio or visual data matching the person identified by the search parameter as one or more search results;
cause rendering of the one or more search results around the user, using virtual reality, at different positions in a three dimensional space; and
automatically increase a field of view of a respective search result of the one or more search results, comprising an image or video, using visual virtual reality, in response to the user looking towards the respective search result for at least a duration of time.

2. An apparatus as claimed in claim 1, wherein causing the rendering of the one or more search results around the user, using virtual reality, at different positions in the three dimensional space, comprises causing rendering of each of multiple different sound objects, using audio virtual reality, at a different position in the three dimensional space.

3. An apparatus as claimed in claim 2, wherein the apparatus is further caused to perform the following: automatically increase an output volume of the sound object rendered at the first position, using audio virtual reality, in dependence upon a time duration a user looks towards the first position.

4. An apparatus as claimed in claim 1, wherein causing rendering of the one or more search results around the user, using virtual reality, at different positions in the three dimensional space comprises causing, for at least a first search result of the one or more search results rendered at a first position, rendering of one of multiple sound objects, using audio virtual reality, at the first position in the three dimensional space and causing display of one of multiple images or videos, using visual virtual reality, at the first position in the three dimensional space.

5. An apparatus as claimed in claim 4, wherein the apparatus is further caused to perform the following: automatically increase a field of view of the image or video displayed at the first position, using visual virtual reality, in dependence upon a time duration a user looks towards the first position.

6. An apparatus as claimed in claim 1, wherein causing rendering of the one or more search results around the user, using virtual reality, at different positions in the three dimensional space comprises if a user looks towards a particular search result of the one or more search results at a particular position in the three dimensional space, initially causing rendering of a sound object, associated with the particular search result, using audible virtual reality at the same particular position in the three dimensional space and then, if the user continues to look towards the particular search result at the particular position in the three dimensional space, causing display of a video, associated with the particular search result, using visual virtual reality at the same particular position in the three dimensional space.

7. An apparatus as claimed in claim 6, wherein the apparatus is further caused to perform the following: if the user continues to look towards the particular search result at the particular position in the three dimensional space, cause display of the video, associated with the particular search result, using visual virtual reality, at the same particular position in the three dimensional space with an increasing field of view.

8. An apparatus as claimed in claim 7, wherein when the field of view increases beyond a particular size switching from a search mode to a playback mode comprising display of the video, associated with the particular search result, using visual virtual reality.

9. An apparatus as claimed in claim 1, wherein the apparatus is further caused to perform at least the following: enable browsing of the one or more search results, rendered using virtual reality at different positions in a three dimensional space, by detecting an orientation of the user in the three dimensional space and when the orientation of the user in the three dimensional space corresponds to a position at which a search result is rendered browsing to that search result.

10. An apparatus as claimed in claim 1, wherein the apparatus is further caused to perform at least the following: enable user selection of one of the one or more search results, rendered using virtual reality at different positions in a three dimensional space, in response to detection that an orientation of the user in the three dimensional space corresponds, for a minimum time duration, to a position at which a search result is rendered.

11. An apparatus as claimed in claim 1, wherein the apparatus is further caused to perform at least the following: perform a two-stage search of content to find content having the search parameter and to provide the found content having the search parameter as one or more search results around the user for rendering using virtual reality, wherein a first stage of the search comprises searching of video content to find video content having the search parameter and provide the found video content having the search parameter as one or more intermediate search results,
  wherein a second stage of the search comprises searching of the one or more intermediate search results to find sound objects having the search parameter and providing the found sound objects having the search parameter as one or more final search results,
  and causing rendering of the one or more final search results around the user, using virtual reality, at different positions in the three dimensional space.

12. An apparatus as claimed in claim 1, wherein the search parameter identifies a person at least one of visually or audibly.

13. An apparatus as claimed in claim 1, wherein the apparatus is a module for a virtual reality device.

14. An apparatus as claimed in claim 1, wherein the apparatus is a head-mounted virtual reality device.

15. An apparatus as claimed in claim 1, wherein causing searching of content to find content having audio or visual data associated with a person identified by the search parameter and to provide the found content having audio or visual data matching the person identified by the search parameter as one or more search results, further comprises using spectral analysis to identify particular sounds in the searched content and determine an associated category, wherein the associated category is one of a human, animal, or nature sound.

16. An apparatus as claimed in claim 1, wherein the apparatus is further caused to perform:
  responsive to the user turning their head clockwise, rotating a rendered sound scene in an anticlockwise direction relative to an angle the user turned their head and keeping the rendered sound scene fixed in space, wherein the rendered sound scene comprises all sound sources in the three dimensional space.

17. A method comprising:
  enabling user definition of a search parameter, wherein the search parameter identifies a person;
  causing searching of content to find content having audio or visual data associated with the person identified by the search parameter and to provide the found content having audio or visual data matching the person identified by the search parameter as one or more search results;
  causing rendering of the one or more search results around the user, using virtual reality, at different positions in a three dimensional space; and
  automatically increasing a field of view of a respective search result of the one or more search results, comprising an image or video, using visual virtual reality, in response to the user looking towards the respective search result for at least a duration of time.

18. A method as claimed in claim 17, wherein causing the rendering of the one or more search results around the user, using virtual reality, at different positions in the three dimensional space, comprises causing rendering of each of multiple different sound objects, using audio virtual reality, at a different position in the three dimensional space.

19. A non-transitory computer readable medium comprising program instructions stored thereon for performing at least the following:
- enable user definition of a search parameter, wherein the search parameter identifies a person;
- cause searching of content to find content having audio or visual data associated with the person identified by the search parameter and to provide the found content having audio or visual data matching the person identified by the search parameter as one or more search results;
- cause rendering of the one or more search results around the user, using virtual reality, at different positions in a three dimensional space; and
- automatically increase a field of view of a respective search result of the one or more search results, comprising an image or video, using visual virtual reality, in response to the user looking towards the respective search result for at least a duration of time.

* * * * *